United States Patent
Skoog et al.

(10) Patent No.: US 6,904,013 B2
(45) Date of Patent: Jun. 7, 2005

(54) ERROR HANDLING WITHIN POWER AMPLIFIER MODULES IN WIRELESS BASE-STATION

(75) Inventors: Göran Skoog, Göteborg (SE); Hans Weibull, Lindome (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 821 days.

(21) Appl. No.: 09/778,101

(22) Filed: Feb. 7, 2001

(65) Prior Publication Data

US 2001/0017852 A1 Aug. 30, 2001

(30) Foreign Application Priority Data

Feb. 8, 2000 (SE) .............................................. 0000396

(51) Int. Cl.[7] .............................................. G01R 31/08
(52) U.S. Cl. .................... 370/217; 370/335; 455/522; 330/124 D
(58) Field of Search .................... 370/335, 342, 370/374, 332, 315, 320, 331, 333, 358, 216, 220, 217, 338; 330/124 D, 124 R, 298, 57; 455/561, 562.1, 423, 422, 436, 437, 438, 439, 444, 522

(56) References Cited

U.S. PATENT DOCUMENTS

| | | | | |
|---|---|---|---|---|
| 4,028,500 A | * | 6/1977 | McClure et al. | ............ 455/566 |
| 4,225,866 A | | 9/1980 | Levine | |
| 4,859,967 A | * | 8/1989 | Swanson | .................... 330/298 |
| 5,570,343 A | * | 10/1996 | Bishop et al. | .............. 370/216 |
| 5,784,684 A | | 7/1998 | Van Wageningen et al. | |
| 5,861,844 A | * | 1/1999 | Gilmore et al. | ............. 342/374 |
| 5,940,384 A | * | 8/1999 | Carney et al. | .............. 370/347 |
| 5,982,652 A | | 11/1999 | Simonelli et al. | |
| 5,986,500 A | * | 11/1999 | Park et al. | .............. 330/124 D |
| 6,018,644 A | * | 1/2000 | Minarik | ....................... 455/82 |
| 6,078,222 A | * | 6/2000 | Harris et al. | ................ 330/295 |
| 6,122,265 A | * | 9/2000 | Nakamura et al. | .......... 370/332 |
| 6,161,024 A | * | 12/2000 | Komara | ................... 455/562.1 |
| 6,430,200 B1 | * | 8/2002 | Han et al. | ................... 370/500 |
| 6,434,130 B1 | * | 8/2002 | Soininen et al. | ............ 370/331 |
| 6,711,217 B1 | * | 3/2004 | Jeong | ......................... 375/297 |

FOREIGN PATENT DOCUMENTS

| | | |
|---|---|---|
| GB | 2280570 | 2/1995 |
| WO | WO99/48228 | 9/1999 |

OTHER PUBLICATIONS

"An Overview of the Application of Code Division Multiple Access (CDMA) To Digital Cellular Systems and Personal Cellular Networks", May 21, 2991, as submitted to TIA TR45.5 Subcommittee on Mar. 28, 1992.

* cited by examiner

*Primary Examiner*—Brian Nguyen
*Assistant Examiner*—Ian N. Moore

(57) ABSTRACT

CDMA base-station comprising a transmit stage (2, 4, 7, 9, 10, 11, 12) and a receive stage (3, 5, 8, 13) for communicating with mobile terminals has been provided. The transmit stage comprises a multi carrier power amplifier having at least two independent power modules (10, 11) for transmitting signals on at least one traffic channel (TCH) and control and pilot signals on at least one control channel (CCH). Each power module (10, 11) is capable of being operational although the other power module is non-operational. The at least two power modules are normally operating simultaneously and each is contributing with emitting power. The CDMA base station moreover comprises a control module (16) monitoring the error status of the power modules in the base station. When an error signal is detected in base-station indicative of an error in a power module (10, 11), the system immediately ends operation of all traffic channels associated with the erroneous power module (10, 11), but sustains operation of the at least one control channel.

8 Claims, 5 Drawing Sheets

ERROR HANDLING WITHIN POWER AMPLIFIER MODULES IN WIRELESS BASE-STATION

FIELD OF THE INVENTION

The present invention relates to a method for handling errors occurring in a base-station in a CDMA system.

BACKGROUND OF THE INVENTION

As is well known, in wide band direct sequence CDMA systems signals consist of different pseudo-random binary sequences that modulates the carrier. Thereby, the spectrum of the signals is spread over a wide frequency range common to a number of channels in the system. Due to the direct sequence coding, orthogonality between signals is achieved, enabling individual decoding of signals from the common frequency range.

This coding principle has many advantages. For instance, direct sequence spread spectrum coding provide substantial reductions of the severity of multi-path fading, which leads to an effective utilisation of spectrum resources.

Since signals occupy the same space in the frequency/time domain, power regulation of the individual channels is an important aspect of CDMA systems.

CDMA systems employ power control on both the up- and the downlink. One objective of the power control is to regulate each mobile station transmitter operating within the cell site base-station receiver, such that the signals have the same power level at the base-station receiver, regardless of the position or propagation loss of the respective mobile stations.

When all mobile station transmitters within a cell site are so controlled, then the total signal power at the base-station receiver is equal to the nominal received power times the number of mobile stations.

Each selected signal received at the base-station is converted into a signal that carries the narrowband digital information, whereas the other signals that are not selected remain wide band noise signal. However, the bandwidth reduction, which is performed according to the decoding process, increases the signal-to-noise ratio from a negative value to a level that allows operation with an acceptable bit error rate.

The overall system capacity, for instance the number of users that can operate within the cell simultaneously, depends on the minimum signal-to-noise ratio, which produces the given acceptable bit error rate.

On the downlink, the cell also supports power regulation by adjusting the downlink power for each signal to the respective mobiles in response to requests provided by the mobile station. The purpose is to reduce power for units that are either stationary, relatively close to the cell site, impacted little by multi-path fading and shadowing effects, or experiencing little other cell interference. Thereby the overall noise level diminishes and those mobiles being in a more difficult environment will benefit.

In a CDMA system running close to its capacity maximum, the emission of excessive power on only a single coding channel is critical. A single excessively "loud" mobile will disturb other mobiles, which in their turn will require higher power because of the reduced signal to noise ratio. This effect will spread to adjacent parts of the system and communications in the cell. In a fully loaded cell, the addition of one more mobile will result in about 35% loss of capacity.

Therefore, both up- and downlink channels are minutely regulated to avoid the above overload situation from occurring and for this reason new mobiles may be exempt from being allowed into the system when the system is running close to its capacity maximum.

Current CDMA systems are able to offer a variety of services, such as providing data-communication channels with varying data rates. Since a higher bit error rate corresponds to a higher capacity, also the data rates allocated to individual mobiles may be regulated in order to avoid the above mentioned overload situations from occurring.

Another important aspect of CDMA systems is that the so-called soft hand-over between base stations and inter-cell channels may be implemented.

In CDMA systems, the same channel is re-used in adjacent cells whereby mobiles may receive a combination of the respective same signals being emitted from more base-stations (i.e. neighbouring cells).

In CDMA systems, each cell transmits a pilot carrier signal. This pilot is used by the mobile station to obtain initial system synchronisation and to provide robust, time, frequency and phase tracking of the signals from the cell site. The pilot signal is tracked continuously by each mobile station. Variations in the transmitted power level of the pilot signal control the coverage area of the cell and the number of mobiles communicating with the respective cell.

At call initiation, the subscriber is supplied a tailored set of handoff thresholds and a list of cells that are most likely to be the candidates for hand-off. While tracking the signal from the original cell, the subscriber searches for all possible pilots and maintains a list of all pilots whose signals are above a threshold established in the initial set-up. This list is transmitted to the base-station controller whenever it is requested, whenever the list changes by having a new pilot in the list or when an existing pilot falls below a level that is useful to support traffic.

Upon command from the radio network controller (RNC), via the initial cell, the mobile unit commences tracking the second cell and uses diversity combining of the two signals, representing identical data, to enhance the overall received signal. Power control information is received from both cells; and both cells have to request a power increase for the subscriber to increase its power.

Data from the mobile unit is received by both cells in question and is forwarded to the radio network controller where the best source is selected on a frame by frame basis and is used to represent the data transmitted from the mobile.

A particular advantage by the power regulation described above and the soft-handover is that the capacity of cells is automatically regulated in case of an inhomogeneous cell load.

If some cells are more heavily loaded than others, then the remaining cells contribute less interference to their more heavily loaded neighbours and allow more mobile stations to operate in these cells. The reduction of interference leads to a capacity increase for the loaded cell. For instance, if the surrounding cells run at 30% load, the capacity of the loaded cells increases to 120%.

This flexible allocation of capacity happens automatically due to the power regulation routines described above. The network management system detects the current load situation and allows higher power levels in the heavily loaded cell.

Aspects of the CDMA features described above has for instance been described in "An overview of the application of code division multiple access (CDMA) to digital cellular systems and personal cellular networks", May 21, 1992, Document Number EX60-10010 Qualcom Incorporated™.

Further details relating to soft handover can for instance be found in EP-A-0 537 795.

Details relating to CDMA systems can be found in the standard denoted 3GPP UTRAN Release 99.

SUMMARY OF THE INVENTION

The power amplifiers for CDMA base-stations must comply with accurate specifications for noise, linearity, distortion and reliability, which render the amplifiers expensive.

Although base-stations typically are made to comply with strict reliability standards, even redundant modules can be subject to fault conditions.

One object of the present invention is to accomplish effective provisions, which diminishes the outage time in a CDMA system if such fault conditions should occur in a base-station power module or related module.

This object has been accomplished by the subject matter defined by claim 1.

According to the subject matter of claim 1, a CDMA base-station has been accomplished, which effectively reduces the adverse effects, this arises from such a fault condition.

When the above fault condition occurs, the error ridden base-station immediately cancels downlink communication with the mobiles in the given cell. Those mobiles which appears in a soft handover, i.e. receives signals simultaneously from at least two base-stations, are "forced" on to the neighbouring base-stations involved in the soft handover, while those mobiles receiving information exclusively from the error ridden base-station will loose the receive signal.

As will be understood, the damage is only local, that is, restricted to the latter mobiles, whereas the remaining system will be unaffected.

In comparison to the overload situation in a CDMA system not providing the error routine according to the invention, a significant advantage has been accomplished.

It is a further object to provide a base-station, which can run efficiently, even after a fault has occurred.

This object has been accomplished by the method defined by claim 2.

According to the subject matter defined by claim 3, a CDMA system has been defined in which the process of re-allocating as many mobiles a possible to adjacent cells, when a fault in a power module has occurred, is accomplished.

According to claim 5, a method for controlling a CDMA base-station has been defined.

Further advantages will appear from the following detailed description of preferred embodiments of the invention.

DETAILED DESCRIPTION OF A PREFERRED EMBODIMENT OF THE INVENTION

Figure 1:
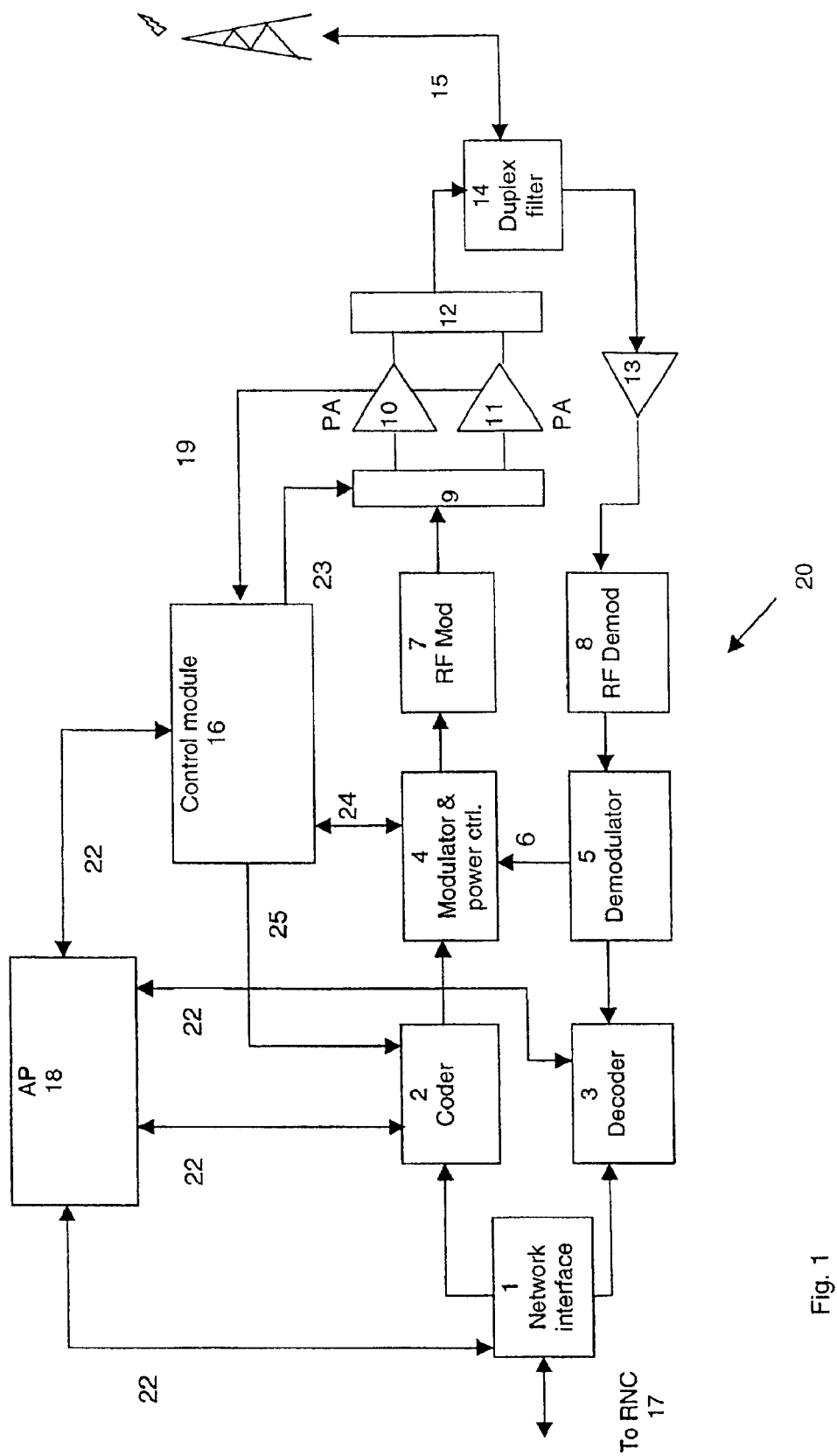
FIG. 1 shows a base station according to the invention comprising two separate power modules.

In FIG. 1, a block diagram pertaining to the base station according to the invention has been shown. The CDMA base station (BS) 20 is coupled via a network interface 1 to a radio network controller RNC 17. All data to and from the network transfers this interface 1.

The base station (BS) 20 comprises a receive stage and a transmit stage.

The latter transmit stage comprises an output section comprising an encoder 2, performing base band direct sequence division multiplex access coding including multiplexing, interleaving and frame building on a number of communication channels.

A first modulator 4 performs channel spreading, scrambling, data modulation and sector combining. The first modulator 4 moreover controls the output power of the individual channels emitted by the base station.

A second modulator 7, up-converts the transmission signals from base band signals to the desired radio frequency signals and controls the output power.

From the second modulator 7 the signal is passed on to a multi carrier power amplifier having two independent power modules 10, 11 for transmitting signals on the at least one traffic channel, TCH, and control and pilot signals on the at least one control channel, CCH. This power amplifier is designed to meet the high linearity requirements of CDMA standards.

Each power module 10, 11 is capable of being operational even though the other power module is non-operational. The power modules are normally operating simultaneously and each power module is contributing with emitting power.

A power splitter 9 has been provided, for selectively channel the signal to one or more of the power amplifier modules 10 and 11. The power splitter can be so controlled as to shut of the signal to any of the power amplifier modules 10 and 11. According to the present embodiment, only two power amplifier modules have been provided, but many more amplifier modules each contributing with power could be provided.

Each amplifier module 0 and 11 is provided with at least one diagnostic output 19, by which the operative status of the respective amplifiers 10, 11 can be derived.

The amplified signals from power amplifier modules 10 and 11 are combined in high power combiner 12, adding the outputs from the respective power amplifier modules so that a high power signal of desired magnitude is accomplished.

Multi carrier power amplifiers are generally available on the market today. One example of such an amplifier is sold by Powerwave®.

The high power signal is lead to duplex filter 14, which feeds a common receive/transmit antenna.

Now, the receive section shall be described.

From the common antenna, receive signals are derived from mobile stations through the duplex filter 14. These signals are provided to a low noise amplifier LNA 13, from which a first radio frequency demodulator 8 demodulates the received signal.

A second baseband demodulator 5 performs de-spreading, de-scrambling and demodulation of the input signal. The second demodulator 5 also evaluates so-called traffic channel power control (TPC) bits from signals sent by the mobile stations.

The second baseband demodulator communicates with the first modulator 4 via a TPC signal 6, whereby the second baseband demodulator 5 issues the needed power adjustments relating to the respective traffic channels.

From the demodulator 5, the input signals are passed further on to a decoder 3, in which signals are subject to the opposite processes described in connection with the encoder 5. The resulting signals are delivered to the network interface 1 for further transmittal to the radio network controller, RNC 17.

The base station furthermore comprises a control module 16, which monitors the status of the respective power amplifiers 10 and 11 via the diagnostic lines 19. The control module moreover controls the power splitter 9 and signals to the encoder 2 and the baseband modulator and power control according to a fault routine. The control module 16 signals to the power splitter 9, via power splitter signal 23, which of the power amplifiers shall contribute with power. The control module furthermore communicates with encoder 2 and the first modulator 4, by means of encoder control signal 25 and first modulator control signal 24, respectively. The base station 20 moreover comprises an application processor (AP) 21, which controls the overall functionality of the cell. The application processor 21 allocates mobile stations in co-operation with the radio network control (RNC) to the base station in accordance with known authorisation procedures. The application processor AP 18 communicates with the network interface 1, the encoder 2, the decoder 3 and the control module 16 over a common AP bus 22.

In case an error is detected in any of the power amplifiers, the control module shuts off the faulty power module according to a fault routine that shall be explained in the following.

However, first the normal operation of the base station and the mobile stations will be exemplified.

Figure 2:
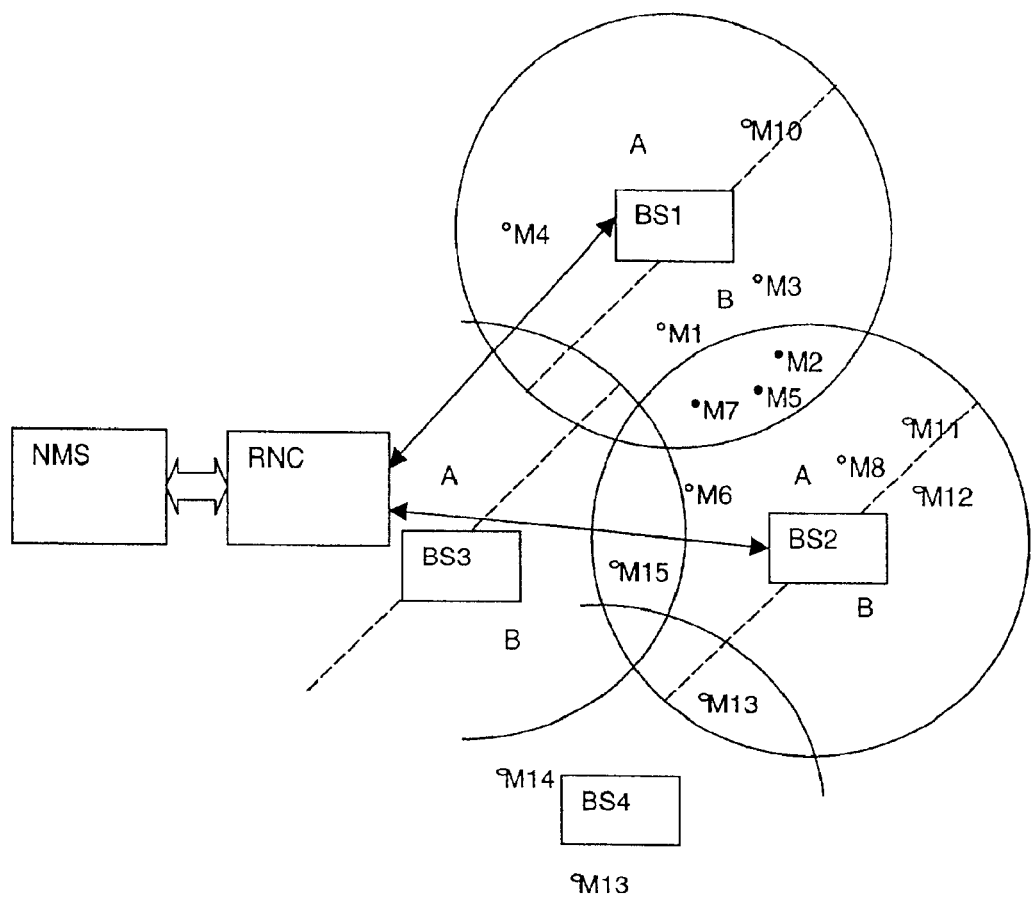
FIG. 2 shows four base-stations and associated cells each cell being divided into two sectors.
Figure 3:
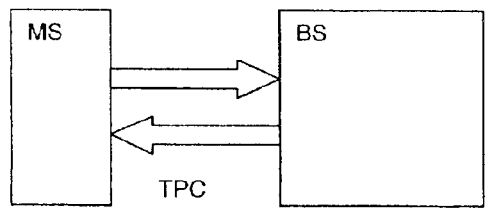
FIG. 3 is a schematic representation of the traffic power control loop between a mobile terminal and a base station (not in soft handoff)

Turning to FIG. 2, an exemplary cell pattern has been indicated. As appears from the figure four base stations BS1–BS4 have been shown, and each base station is affiliated with two antennas splitting each cell into two sectors A and B. Many other sector formations are optional, such as the typical three sectors or no sectors at all. As appears from FIG. 2, some mobile stations will appear in the overlapping area between two cells, such as mobile stations M2, M5 and M7. These stations will communicate with base stations BS1 and BS2 in combination in soft handover. That is, the same downlink signal, although phase lagged, relating to a particular traffic channel is transmitted to neighbouring sectors when a mobile station is located in this area and a resulting down link signal will be combined from any of the respective base station signals, which reach the mobile station in question. The resulting receive signal is resolved in the mobile station by means of conventional filterbanks and forward error control mechanisms. The same applies to the uplink signals where a combination/resolving of signals appear in the RNC, as is known in the art.

Other mobile stations will communicate with two sectors relating to the same base station, such as mobile stations M8, M11 and M12 which appears in the border area of sectors A of BS2 and B of base station BS2. Those mobiles are said to be in a state of softer hand over.

Both up-link and downlink traffic channels relating to each mobile station is regulated according to an exemplary TPC (transmittal power control) loop. These mechanisms are generally known in the art and only the downlink transmission shall be described here.

Figure 4:
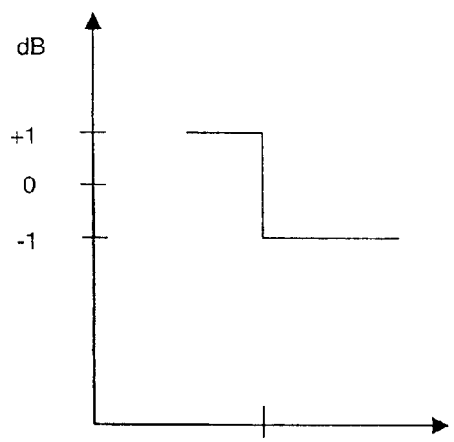
FIG. 4 is a schematic representation showing the incremental output power from a base station requested by a mobile station as a function of the measured power on an allocated traffic channel received at the mobile station.
Figure 5:
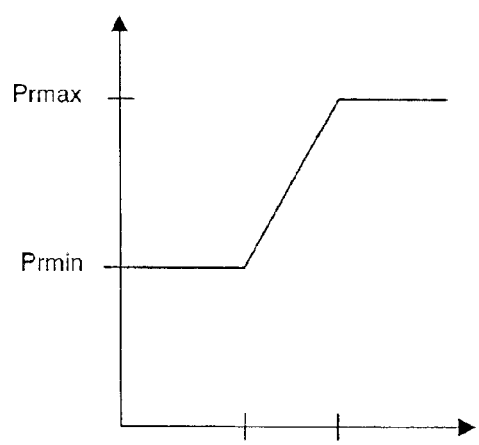
FIG. 5 shows the admitted output power by the base station as a function of an absolute power request.
Figure 6:
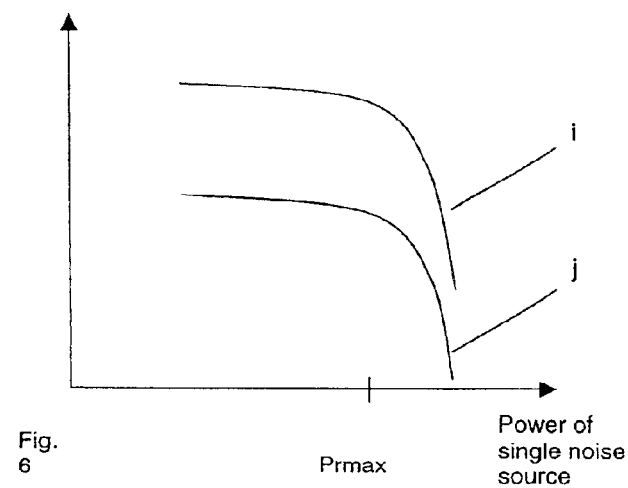
FIG. 6 is a schematic diagram exemplifying the number of mobile stations being able to communicate simultaneously in a CDMA cell as a function of the emitting power of a single noise source/unregulated mobile station.

The transmittal power control loop has been illustrated in FIGS. 4 and 5. The emitting power of the base station is controlled at regular cycles. If the received power at the mobile station falls under a threshold SIR1, the mobile station will request a 1-dB power increase and the base station will regulate its power correspondingly in the next cycle. If the signal to noise level exceeds threshold SIR1, the base station will request a 1dB-power reduction and the mobile station will regulate its output power correspondingly in the next cycle. This regulation takes place within a fixed power band, limited by the rated power maximum, Prmax, and the rated power minimum, Prmin, as indicated in FIG. 5, whereby an upper limit and a lower limit has been defined.

Figure 7:
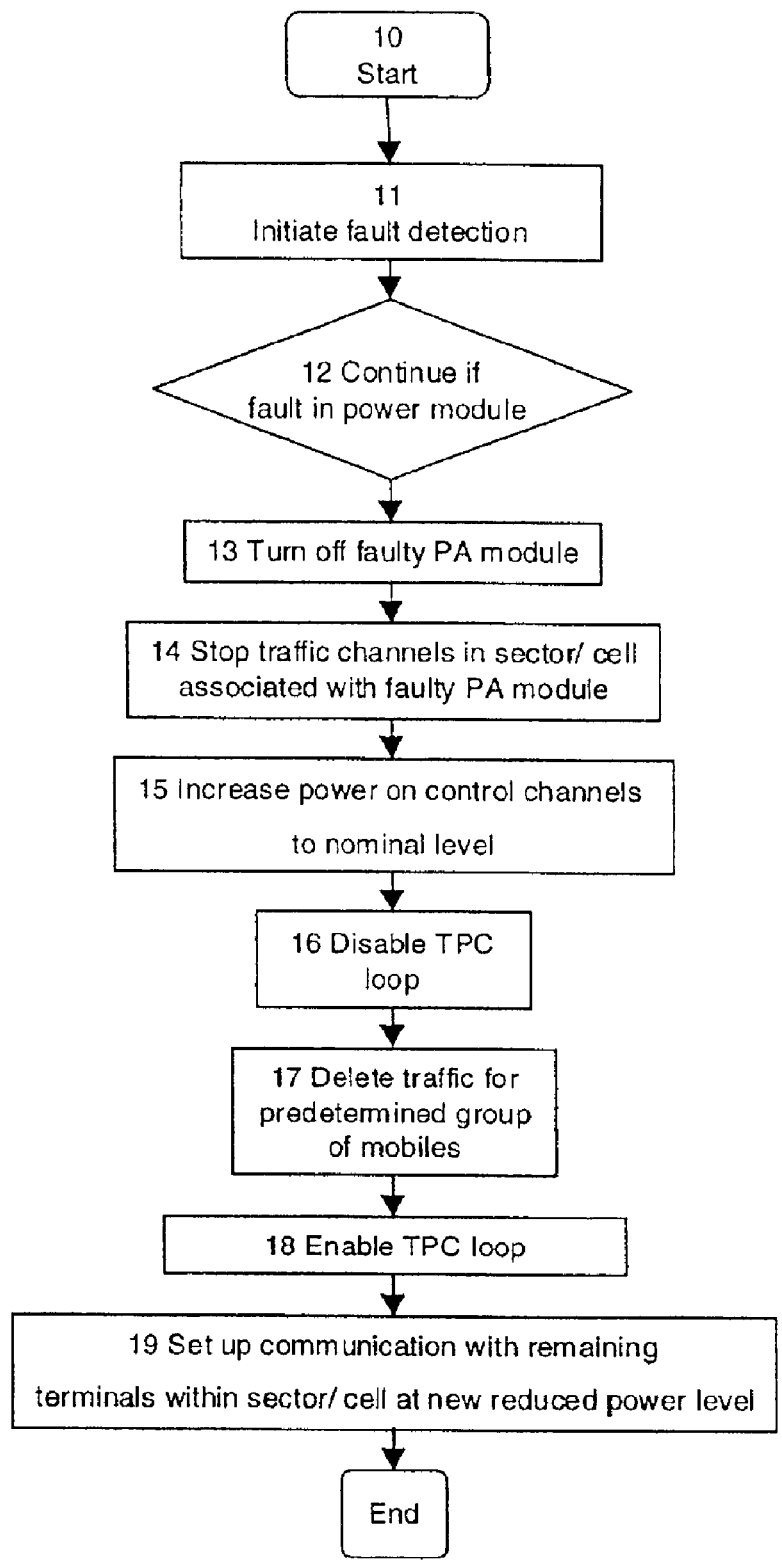
FIG. 7 shows a flow diagram of a preferred fault routine according to the invention.

In FIG. 7, a schematic illustration of the capacity of the system has been depicted for mobile terminals using a unitary bandwidth as a function of a single noise source, such as a single unregulated mobile terminal. The upper curve, i, relates to the capacity in the cell with fully operational power modules, whereas the lower curve, j, relates to the capacity with a faulty power module.

Other TPC mechanisms from what has been shown in FIG. 4 are possible, for instance using a measure of hysteresis and two thresholds, instead of SIR1, to avoid a continues change of levels.

The error routine residing in the control module 16 will now be explained especially with reference to FIG. 7, but also to FIGS. 1, 2, 8 and 9.

The routine starts in step 10 and in step 11, the fault detection is initiated.

Figure 8:
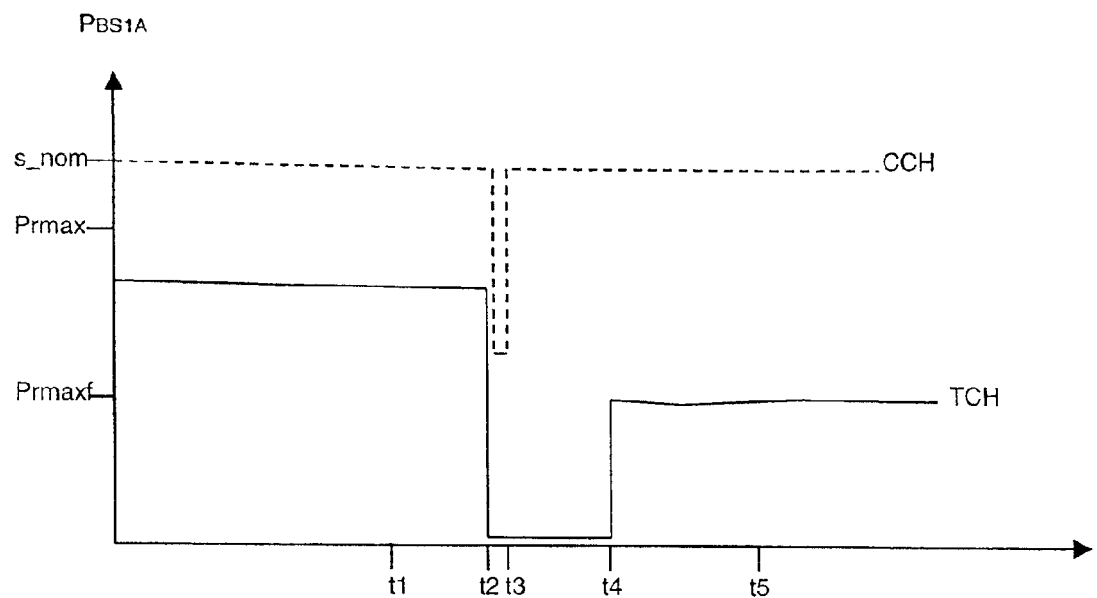
FIG. 8 shows the output power of the control and a traffic channel emitted from a sector experiencing a faulty power module according to the fault routine of FIG. 7.
Figure 9:
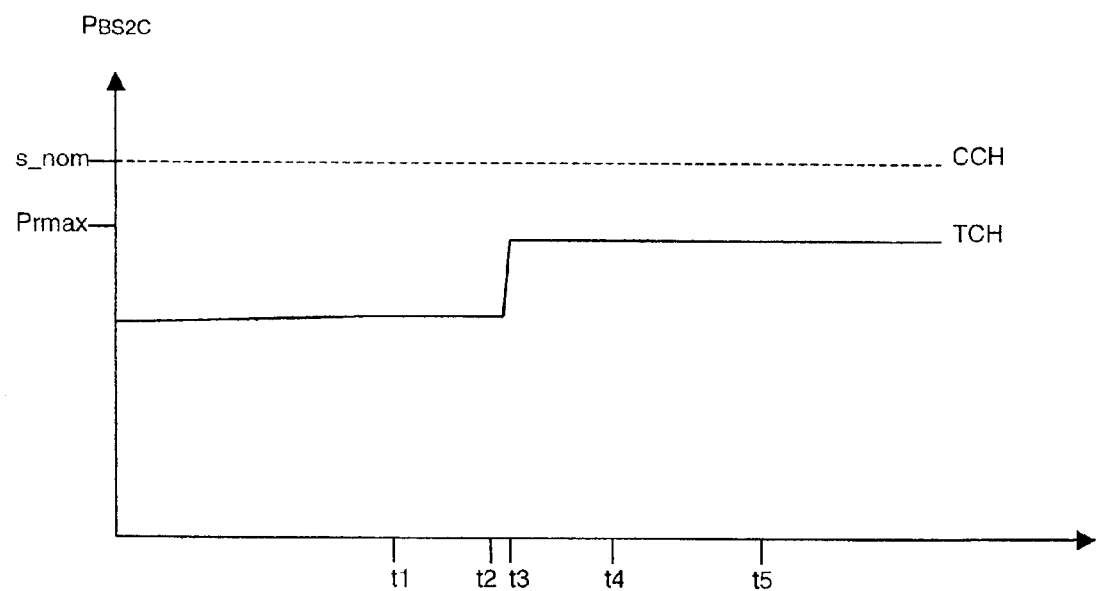
FIG. 9 shows the output power of the control and traffic channel emitted from an adjacent sector to the sector experiencing a faulty power module.

In FIGS. 8 and 9, the output power of the control and the traffic channel have been shown for two neighbouring sectors in FIG. 2, namely BS1A and BS2A, by way of example. The respective control channel output power has been indicated by graph CCH and the respective traffic channel output power has been indicated by graph TCH. The control channel is normally set to a nominal output power s_nom. The rated maximum output power of a traffic channel of a fully functional base station sector has been denoted Prmax, while the maximum output power of the power amplifier for the traffic channels with one power module being shut off has been denoted by the level Prmaxf.

When the fault routine has been initiated in step 11, in which the control module 16 is continuously checking whether any of the power modules 10 and 11 in the power amplifier has been subject to a fault, step 12. This is checked over the diagnostic lines 19.

At time t1, the traffic channel output power TCH of base station BS1B is running at level P4, which is below the maximum rated output power Prmax, and the control channel CCH is emitted at the nominal level s-nom.

If a fault is detected in for instance power module 10, according to step 12, the routine goes to step 13 in which the faulty power module is shut off. Immediately thereafter, in step 14, data on traffic channels associated with sector BS1B are stopped but the control channel is immediately seeked restored to its nominal value.

For this purpose, the control module 16 sends a signal to encoder 2 to stop the respective traffic channels.

In FIG. 8 at time t2, the traffic channels are shut off. The control channel however is prioritised, such that the remaining functional power module 11 supports the control channel, and according to step 15, the power on the control channel is increased to nominal level. As appears from FIG. 8, the fault possibly gives rise to a glitch, shown between t2 and t3 in FIG. 7.

The priority being given to the control channel is also accomplished by means of step 16, in which the TPC loop for the mobile stations are being disabled. For this purpose, the control module 16 signals to the first modulator 4, to stop the TPC requests for more power from the mobile stations, which could appear.

Thereby, all mobile stations in sector BS1B remain synchronised and ready for taking up communication.

It is preferable, that no glitch occur in the control channel, or alternatively that the power amplifiers are designed in such a way that the duration of the glitch has no practical influence on the control channel and thereby the synchronisation of the mobile stations.

As soon as the traffic channel power from base station BS1B decreases, the mobile stations appearing in soft handover between BS1B and the neighbouring sector BS2A—in this case M2, M5 and M7, will require more power from base station BS2A. Therefore, the emitted traffic channel power of BS2A increases between t2 and t3 to—in this case chosen as an example—the rated maximum value Pmax.

Insofar, the power increases up to the limit Pmax, the base station BS2B will have to economise with its available power and reduce the number of mobiles being allocated to the base station, that is, some mobile stations will be dropped.

As appears from FIGS. 2 and 8, all those mobile stations not being in soft handover, M2, M5 and M7, looses traffic data.

The routine now enters step 17, in which the AP in BSB1 decides on how many and which mobile stations should continue communicating with the faulty sector BSB1 with the remaining power resources from power module 11. Many options exist for choosing a predetermined group of mobile stations that should have their links cancelled. One advantageous solution is to give priority to those mobiles being in soft handover or softer handover, in this example for instance M2, M5 and M7. If this group is not sufficient to cover the expected power loss, mobiles in soft handover are chosen.

Depending on how the mobile stations are distributed also mobile stations not being in soft handover and inside the sector BSB1 could be cancelled.

Another option is to select randomly a number of mobile stations, which should be interrupted.

Another option is to prioritise those mobiles, which receives or issues most power or takes up most bandwidth.

As soon as the above selection has been made and the re-allocation implementation has been accomplished, the routine goes to step 18, in which the TPC loop is enabled for the mobile stations in BSB1. The control module issues a corresponding signal to the first modulator 4.

Now the routine enters step 19, in which communication is started up with the remaining terminals in the sector at a new reduced target power level. This has been exemplified in FIG. 7 at time t4, where the traffic channels are emitted at power level Prmaxf.

As will be understood, the effect of the fault routine according to the invention is that a large number of mobile stations can continue communicating instead of the whole sector/cell is suffering a breakdown. This leads to better outage figures than what have been possible in conventional CDMA systems.

Reference Signs 1 network interface
2 encoder
3 decoder
4 first modulator
5 second demodulator
6 TPC signal
7 second modulator
8 first demodulator
9 power splitter
10 first power amplifier
11 second power amplifier
12 combiner
13 low noise amplifier
14 duplex filter
15 antenna feed
16 control module
17 error signalling
18 application processor
19 diagnostic line
20 BS/base station
21 RNC/radio network controller
22 AP bus
23 power splitter control signal
24 first modulator control signal
25 encoder control signal

What is claimed is:

1. CDMA base-station comprising a transmit stage (2, 4, 7, 9, 10, 11, 12) end a receive stage (3, 5, 8, 13) for communicating with mobile terminals, the transmit stage comprising a power amplifier having at least two independent power modules (10, 11) for transmitting signals on at least One traffic channel (TCH) end control and pilot signals on at least one control channel (CCH), each power module (10, 11) being capable of being operational even though one other power module is non-operational, the at least two power modules normally being adapted for operating simultaneously and each contributing with emitting power, whereby the CDMA base station moreover comprises a control module (16) monitoring error status of the power modules in the base station, the control module carrying out an error routine, in which the following steps are undertaken, when an error signal is detected in the base-station indicative of an error in one of said power modules (10, 11), immediately ending operation of all traffic channels associated with the erroneous power module (10, 11), but sustaining operation of the at least one control channel (CCH);

wherein when the control channel (CCH) is restored after a fault in one of said power modules has occurred, the base-station;

disables the traffic channel power control (TPC) power loop;

deletes traffic for a predetermined group terminals;

enables the TPC power loop;

sets up communication with remaining terminals in sector; and allocates traffic channels (TCH) in sector to remaining terminals at a new reduced power level (Prmaxf).

2. CDMA system according to claim 1, whereby, when one of said faulty power module (10,11) in a given cell has been detected, the emission power levels and thereby the capacity of adjacent cells are enhanced.

3. CDMA base station according to claim 1, comprising a power splitter (9) and a power combiner (12), the power splitter (9) selectively feeding each power module in response to a power splitter control signal (23), such power module (10, 11) having diagnostic lines (19) on which the error states of the power modules are indicated.

4. Method for controlling a CDMA base station comprising a transmit stage and a receive stage for communicating with mobile terminals, the transmit stage comprising a power amplifier having at least two independent power modules (10, 11) transmitting signals on at least one traffic channel (TCH) and control and pilot signals on at least one control channel (CCH), each power module (10, 11) being capable of being, operational even though one other power module is non-operational, the at least two power modules normally being adapted for operating simultaneously and each contributing with emitting power, whereby the method comprises the following steps, continuously monitoring a status of individual power modules in the base station, if a fault in a power module is detected, turning off the faulty power module (10, 11), stopping traffic channels (TCH) in sector associated with faulty power module (10, 11), increase power on control channel (CCH) to nominal level disable TPC power loop, delete traffic for predetermined group of terminals, enable TPC power loop, set up communication with remaining terminals in sector, allocate traffic channels (TCH) in sector to remaining terminals at new reduced power level (Prmaxf).

5. Method according to claim 4, whereby the base-station under regular operation continuously defines the predetermined group of mobile terminals meant to have their communication cancelled.

6. Method according to claim 5, whereby the predetermined group as a priority comprises the mobile terminals being in soft handover or softer handover.

7. Method according to claim 5, whereby, the predetermined group comprises a random selection of the mobile terminals.

8. Method according to claim 5, whereby the predetermined group is prioritised by those the mobile terminals which receives or issues most power or bandwidth.

* * * * *

UNITED STATES PATENT AND TRADEMARK OFFICE
CERTIFICATE OF CORRECTION

| | |
|---|---|
| PATENT NO. | : 6,904,013 B2 |
| APPLICATION NO. | : 09/778101 |
| DATED | : June 7, 2005 |
| INVENTOR(S) | : Goran Skoog et al. |

It is certified that error appears in the above-identified patent and that said Letters Patent is hereby corrected as shown below:

In Column 4, Line 63, delete "0" and insert -- 10 --, therefor.

In Column 8, Line 49, in Claim 1, delete "end" and insert -- and --, therefor.

In Column 9, Line 6, in Claim 1, after "group" insert -- of --.

In Column 9, Line 20, in Claim 3, delete "such" and insert -- each --, therefor.

In Column 10, Line 3, in Claim 4, after "the" insert -- fault --, therefor.

Signed and Sealed this

Thirtieth Day of October, 2007

JON W. DUDAS
*Director of the United States Patent and Trademark Office*